(12) United States Patent
Burger et al.

(10) Patent No.: US 12,391,212 B2
(45) Date of Patent: *Aug. 19, 2025

(54) SYSTEMS AND METHODS FOR IMMOBILIZING A VEHICLE

(71) Applicant: Verizon Connect Development Limited, Dublin (IE)

(72) Inventors: Louis Burger, Dublin (IE); Sean McGINN, Dublin (IE); Mark Swords, Naas (IE); Anton G. Wigley, Dublin (IE); Jose M. Gomez Monterrosa, Jr., Dublin (IE); Nicholas Hooper, Dublin (IE)

(73) Assignee: Verizon Connect Development Limited, Dublin (IE)

( * ) Notice: Subject to any disclaimer, the term of this patent is extended or adjusted under 35 U.S.C. 154(b) by 497 days.

This patent is subject to a terminal disclaimer.

(21) Appl. No.: 17/663,268

(22) Filed: May 13, 2022

(65) Prior Publication Data

US 2022/0266793 A1 Aug. 25, 2022

Related U.S. Application Data

(63) Continuation of application No. 16/880,433, filed on May 21, 2020, now Pat. No. 11,338,769.

(51) Int. Cl.
*B60R 25/40* (2013.01)
*B60R 25/045* (2013.01)
*B60R 25/20* (2013.01)
*B60R 25/22* (2013.01)

(52) U.S. Cl.
CPC .......... *B60R 25/045* (2013.01); *B60R 25/209* (2013.01); *B60R 25/225* (2013.01); *B60R 25/403* (2013.01); *B60R 2325/30* (2013.01)

(58) Field of Classification Search
CPC ... B60R 25/045; B60R 25/209; B60R 25/225; B60R 25/403; B60R 2325/30
See application file for complete search history.

(56) References Cited

U.S. PATENT DOCUMENTS

| 4,207,850 A | 6/1980 | Wharton |
| 4,438,752 A | 3/1984 | Cheung |
| 4,479,064 A | 10/1984 | Monsen |
| 5,003,287 A | 3/1991 | Peters et al. |
| 5,404,129 A | 4/1995 | Novak et al. |
| 5,519,376 A | 5/1996 | Iijima |
| 5,539,388 A | 7/1996 | Modgil |
| 5,729,192 A * | 3/1998 | Badger .................. B60R 25/04 307/10.6 |
| 5,811,886 A * | 9/1998 | Majmudar .............. B60R 25/04 340/426.3 |
| 5,982,292 A | 11/1999 | Tagawa et al. |

(Continued)

Primary Examiner — Nay Tun

(57) ABSTRACT

A device may receive an arming signal associated with immobilizing a vehicle. The device may monitor, based on receiving the arming signal, a current associated with an electrical power output from a battery of the vehicle. The device may detect that a measurement of the current satisfies a threshold associated with an ignition component starting an engine of the vehicle. The device may control, based on detecting that the current satisfies the threshold, a bypass circuit to reduce the electrical power output to prevent the ignition component from starting the engine.

20 Claims, 9 Drawing Sheets

(56) References Cited

U.S. PATENT DOCUMENTS

| | | |
|---|---|---|
| 6,028,505 A | 2/2000 | Drori |
| 6,150,923 A | 11/2000 | Johnson et al. |
| 2005/0242971 A1* | 11/2005 | Dryer .................... B60R 25/102 |
| | | 340/539.19 |
| 2007/0262750 A1 | 11/2007 | Yun et al. |
| 2008/0114501 A1 | 5/2008 | Wu |
| 2008/0218322 A1 | 9/2008 | Shii |
| 2010/0123465 A1 | 5/2010 | Owens et al. |
| 2012/0101674 A1 | 4/2012 | Wang et al. |
| 2013/0131904 A1 | 5/2013 | Park et al. |
| 2015/0210249 A1* | 7/2015 | Morris .................... B60R 25/04 |
| | | 701/1 |
| 2017/0217405 A1 | 8/2017 | Wang |
| 2017/0313197 A1 | 11/2017 | Yamada et al. |
| 2018/0093640 A1 | 4/2018 | Ostreikovskiy et al. |
| 2020/0189405 A1 | 6/2020 | Westfall et al. |
| 2020/0343763 A1 | 10/2020 | Wataru |

\* cited by examiner

SYSTEMS AND METHODS FOR IMMOBILIZING A VEHICLE

RELATED APPLICATION

This application is a continuation of U.S. patent application Ser. No. 16/880,433, entitled "SYSTEMS AND METHODS FOR IMMOBILIZING A VEHICLE," filed May 21, 2020 (now U.S. Pat. No. 11,338,769), which is incorporated herein by reference in its entirety.

BACKGROUND

Vehicle immobilization is a mechanism for preventing an unauthorized vehicle from operating. An engine of a vehicle may be prevented from starting or igniting at certain times, under certain conditions, and/or the like to immobilize the vehicle.

DETAILED DESCRIPTION OF PREFERRED EMBODIMENTS

The following detailed description of example implementations refers to the accompanying drawings. The same reference numbers in different drawings may identify the same or similar elements.

A vehicle may be immobilized by preventing power from a battery of a vehicle from igniting or starting an engine of the vehicle (e.g., by cutting power from the battery when the engine is started). However, preventing power from a battery of a vehicle from igniting or starting an engine of the vehicle may require one or more wires to be altered (e.g., cut, a wiring configuration of the vehicle to be changed or altered, and/or the like) to monitor electrical power from an ignition component of the vehicle, cut power to the vehicle, and/or the like. This may result in a reduced performance of the vehicle (e.g., based on cutting wires and/or altering a wiring configuration).

Moreover, different vehicles may have different wiring configurations. As a result, different alterations may be required for different vehicles, thereby increasing the complexity associated with immobilizing the vehicle. Additionally, cutting power from the battery when the engine is started may result in power being lost for other components of the vehicle, such as an onboard computing system, an electronic control unit of the vehicle, and/or the like. This may cause components of the vehicle to reset or restart, resulting in undesired effects (e.g., loss of stored information, loss of user preferences, and/or the like).

Some implementations described herein enable a device to monitor a current from an electrical power output of a battery of a vehicle, detect that a measurement of the current satisfies a threshold associated with an ignition component starting an engine of the vehicle, and reduce the electrical power output of the battery to prevent the ignition component from starting the engine. In some implementations, the device may include a power output connector configured to connect to a lead of an electrical system of the vehicle that has a same configuration as a terminal of the battery. As a result, the device may reduce the complexity associated with immobilizing a vehicle by eliminating the need to cut wires or alter a wiring configuration of the vehicle. Moreover, the device may ensure that other components of the vehicle may continue to receive power while preventing an ignition component of the vehicle from starting the engine of the vehicle. This may eliminate the undesired effects associated with cutting power to the other components of the vehicle.

Figure 1A:
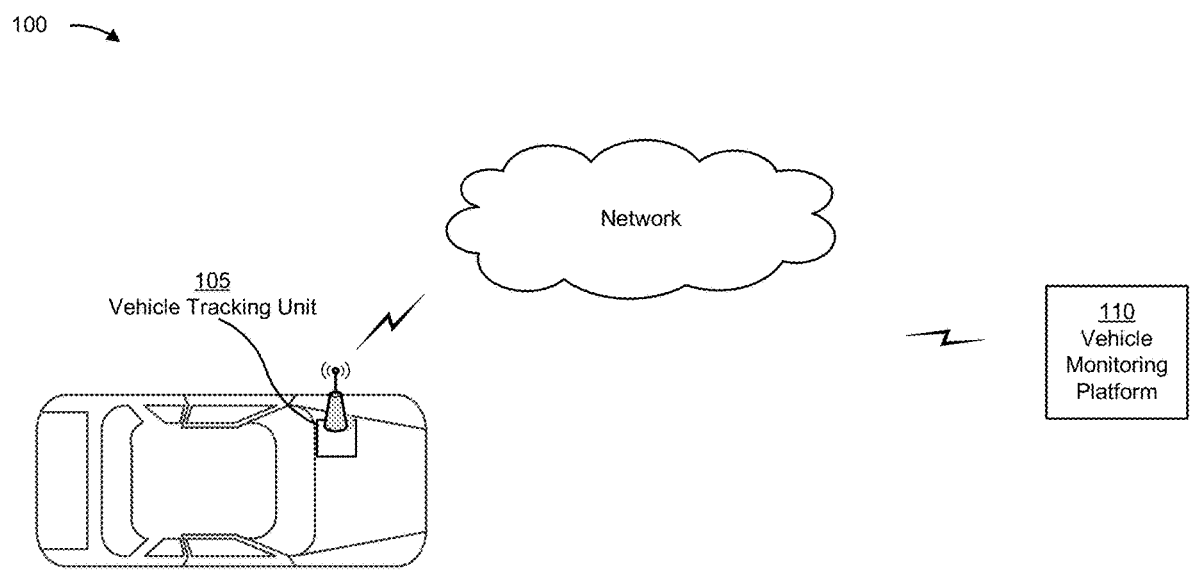
FIGS. 1A-1E are diagrams of an example implementation described herein.

FIGS. 1A-1E are diagrams of an example 100 associated with systems and methods for immobilizing a vehicle. As shown in FIGS. 1A-1E, example 100 may include a vehicle tracking unit 105 and a vehicle monitoring platform 110 associated with a vehicle. As shown in FIG. 1A, the vehicle tracking unit 105 and the vehicle monitoring platform 110 may communicate over a network (e.g., a cellular network).

The vehicle tracking unit 105 may include one or more devices capable of receiving commands, instructions, and/or the like from the vehicle monitoring platform 110 associated with control and/or monitoring of the vehicle. The vehicle tracking unit 105 may determine a status of the vehicle (e.g., a movement status such as, moving, stationary, running, and/or the like, a battery status, an engine status, a location status, a movement speed, and/or the like). For example, the vehicle tracking unit 105 may receive a command from the vehicle monitoring platform 110 and may provide a signal to a component (e.g., a power control unit, an electrical system, an onboard computing system, and/or the like) of the vehicle to cause the component to perform an action (e.g., immobilize the vehicle, track a status of the vehicle, and/or the like), as described herein. The vehicle tracking unit 105 may be physically incorporated within, and may communicate with, the vehicle. The vehicle tracking unit 105 may be incorporated within a vehicle electrical system, such as an electronic control unit of the vehicle (e.g., may be a module of the vehicle electrical system). In some implementations, the vehicle tracking unit 105 may be separate from the vehicle electrical system.

The vehicle monitoring platform 110 may include one or more devices that monitors and manages the vehicle. In some implementations, the vehicle monitoring platform 110 may be associated with a plurality of vehicles (e.g., a fleet of vehicles). The vehicle monitoring platform 110 may be a web-based platform (e.g., may be an application, a website, and/or the like), a server-based platform, a client platform, and/or the like. The vehicle monitoring platform 110 may be accessed by a user associated with the vehicle (or the fleet of vehicles) to manage (e.g., track, control, and/or the like) the vehicle. For example, a user may input a command to the vehicle monitoring platform 110 to immobilize the vehicle (e.g., dynamically input the command). The user may input a command to schedule a certain time period, or reoccurring periods, to immobilize the vehicle (e.g., to immobilize the vehicle on weekends, to immobilize the vehicle between certain times each day (e.g., between 10 PM and 7 AM), to immobilize the vehicle for a certain time period (e.g., for the next 4 days), and/or the like). In some embodiments, an administrator may issue an unscheduled immobilization based on unusual circumstances, such as being alerted to potential thefts in a particular area, or the like. The command to immobilize the vehicle may be referred to herein as an arming command. The vehicle monitoring platform 110 may transmit the arming command to the vehicle tracking unit 105 of the vehicle via the network. In some implementations, the vehicle tracking unit 110 may determine whether the command or input received from the vehicle monitoring platform is associated with an authorized user, an authorized device, an authorized vehicle monitoring platform 110, and/or the like. For example, the vehicle tracking unit 105 may receive a command from the vehicle monitoring platform 110 and may confirm that the command has been received from a vehicle monitoring platform 110 that is associated with the vehicle tracking unit 105, that is included in a list of authorized vehicle monitoring platforms 110, that is associated with an authorized device, and/or the like.

In some implementations, the vehicle tracking unit 105 may be enabled to emit a wireless signal, such as a BLUETOOTH signal, to communicate with nearby wireless devices. For example, a vehicle monitoring platform 110 may be included in a wireless device, such as a mobile phone, a smart phone, a smart device, and/or the like. The vehicle tracking unit 105 may communicate with the nearby vehicle monitoring platform 110 using the BLUETOOTH signal.

Figure 1B:
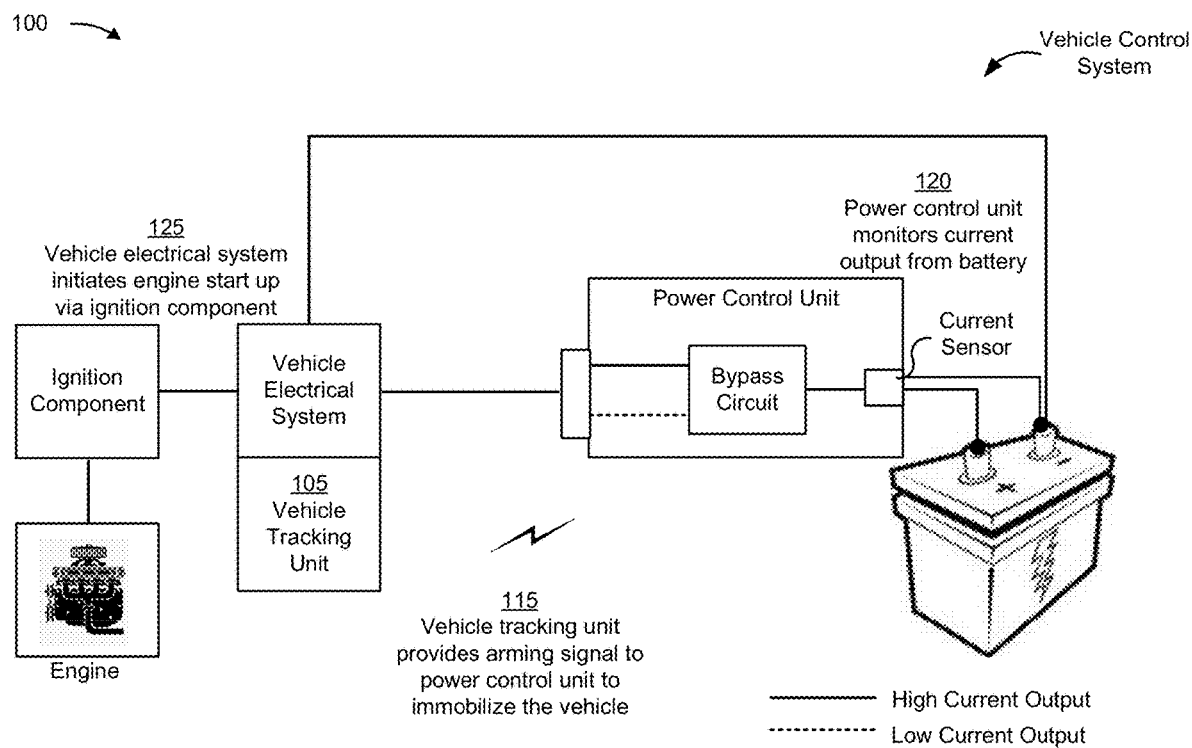

As shown in FIG. 1B, a vehicle control system may include the vehicle tracking unit 105, the vehicle electrical system, an ignition component, and a power control unit to control the flow of electrical current from a battery of the vehicle to the engine and/or the ignition component. As shown by reference number 115, the vehicle tracking unit 105 may provide an arming signal (e.g., based on the vehicle tracking unit 105 receiving an arming command from the vehicle monitoring platform 110, based on a schedule indicated in a command from the vehicle monitoring platform 110, based on a status of the vehicle, and/or the like) to a power control unit to immobilize the vehicle. The vehicle tracking unit 105 may communicate with the power control unit via wireless communications and/or wired communications.

As shown by reference number 120, the power control unit may monitor a current output from a battery of the vehicle based on receiving the arming command from the vehicle tracking unit 105. The power control unit may be connected in series between a lead (e.g., a power input connector, line, wire, and/or the like) of the vehicle electrical system and a terminal of the battery. The power control unit may include a current sensor and a bypass circuit. The power control unit may connect to a terminal of the battery (e.g., a positive terminal of the battery) via a power input connector (e.g., a clamp, a bolt, a cable connector, and/or the like). The power input connector of the power control unit may have the same configuration as a lead of a vehicle electrical system (e.g., that is configured to connect to the terminal of the battery). The power control unit may connect to a lead of the vehicle electrical system via a power output connector (e.g., that is the same configuration as the terminal of the battery). Another lead of the vehicle electrical system may be connected to a second terminal (e.g., a negative terminal) of the battery. As a result, the power control unit may be integrated and/or installed within the vehicle without cutting, modifying, or rearranging any wiring or wiring configurations of the vehicle (e.g., of the vehicle electrical system).

Moreover, as connections between vehicle electrical systems and batteries of vehicles may be universal or standard (e.g., may be a same configuration regardless of the type of vehicle (e.g., manufacturer, model, year of manufacturing, and/or the like) or a type of battery), the power control unit may be universally applicable to all vehicles, regardless of the type of vehicle. Furthermore, installation of the power control unit may be simplified (e.g., compared to cutting, modifying, or rearranging any wiring or wiring configurations of the vehicle) as installation requires only that the power input connector of the power control unit be connected to a terminal of the battery and the power output connector of the power control unit be connected to a lead of the vehicle electrical system.

The current sensor may be a device that detects and measures an electrical current received from the battery. The bypass circuit may be configured to control electrical power from the battery of the vehicle to the vehicle electrical system. The bypass circuit may be connected in series between the lead of the electrical system and the terminal of the battery. The bypass circuit may include a switch component that is configured to direct the current, from a terminal of the battery, directly to a resistor of the bypass circuit or to a power input of the vehicle electrical system (e.g., that is connected to the power output connector of the power control unit). The switch component may be a relay, a transistor (e.g., a field-effect transistor), and/or the like. In some implementations, the bypass circuit may include multiple switch components (e.g., multiple relays, multiple transistors, and/or the like) for redundancy.

The resistor may be configured to reduce an electrical power and/or current output from the battery to the vehicle electrical system to prevent an ignition component of the vehicle from starting an engine of the vehicle. The resistor may have a resistance that corresponds to a threshold percentage of an ignition resistance of the vehicle electrical system. The ignition resistance may be associated with the vehicle electrical system operating the ignition component to start the engine. In some implementations, the resistance of the resistor may be less than 10 ohms (e.g., the resistance may be 5 ohms, 2 ohms, 1.5 ohms, 0.5 ohms, and/or the like). In some implementations, the resistor may be a variable resistor (e.g., a resistor of which the electric resistance value can be adjusted). The resistance value of the variable resistor may be controlled remotely, such as by an input received by the vehicle tracking unit 105 from the vehicle monitoring platform 110. The resistance of the resistor may be such that an output amount of electrical power of the power control unit when passing through the resistor is between a minimum threshold power for powering the vehicle electrical system (e.g., an electrical control unit of the vehicle electrical system) and a minimum threshold power for the ignition component to start the engine. As a result, the vehicle electrical system may continue to receive a sufficient amount of power to run the electrical control unit and/or other electrical components of the vehicle, while the ignition component does not receive a sufficient amount of power and/or current to start the engine. In this way, the vehicle may be immobilized while facilitating an operation of an electronic control unit of the electrical system.

The power control unit may be in an armed state based on receiving the arming signal from the vehicle tracking unit 105. That is, the power control unit may monitor, based on receiving the arming signal from the vehicle tracking unit 105, the current output from the battery to determine whether to activate the switch component of the bypass circuit. While in the armed state, the power control unit may continue to provide electrical power directly to the lead of the vehicle electrical system (e.g., without passing through the resistor of the bypass circuit). As a result, the power control unit may not alter the electrical power and/or current provided by the battery to the vehicle electrical system.

As shown by reference number 125, the vehicle electrical system may initiate an engine start up via the ignition component. The ignition component may be one or more devices configured to start the engine of the vehicle (e.g., a starter, an ignition switch, and/or the like) by causing the battery to provide additional power (e.g., a high current output) to initiate the mechanical process to start the engine (e.g., engine turn over, engine crank, and/or the like). For example, a user of the vehicle may provide an input to the ignition component (e.g., turning a key in an ignition, pushing a push-button to start the engine of the vehicle, and/or the like). The ignition component and/or the vehicle electrical system may cause the battery to provide the high current output to the vehicle electrical system to start the engine.

Figure 1C:
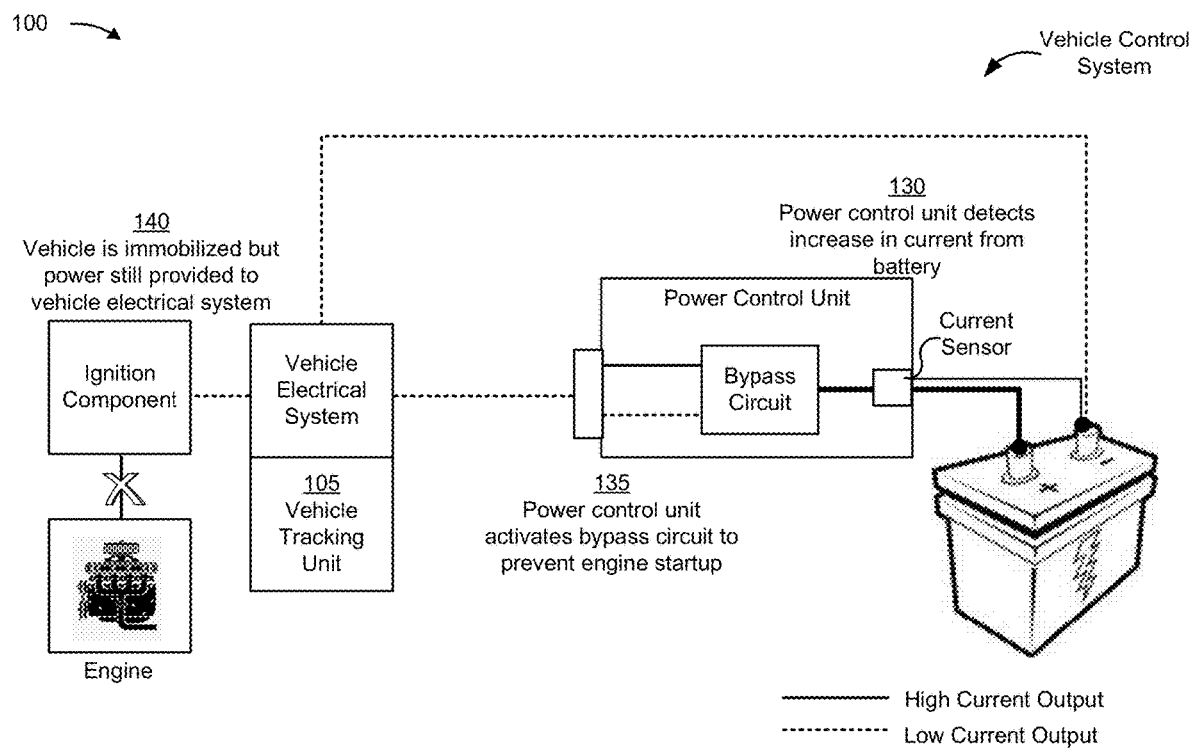

As shown in FIG. 1C, and by reference number 130, the power control unit may detect an increase in a current provided by the battery. For example, as described above, the vehicle electrical system may cause the battery to provide additional power (e.g., the high current output). The power control unit may detect (e.g., via the current sensor of the power control unit) the increase in current from the battery. For example, the power control unit may determine that the current level provided by the battery satisfies a threshold current level associated with starting the engine. The power control unit may determine that, based on the current level provided by the battery satisfying the threshold current level, the vehicle has initiated a startup of the engine. The power control unit may enter an immobilization state based on detecting the increase in current provided by the battery.

As shown by reference number 135, the power control unit may activate the bypass circuit (e.g., by the switch component of the bypass circuit) to direct the current from the battery through the resistor of the bypass circuit (e.g., thereby lowering an electrical power level and/or current level) based on detecting the increase in current from the battery. The immobilization state may refer to a state in which the power control unit has activated the bypass circuit. The bypass circuit may direct the current from the resistor to the lead of the vehicle electrical system. As a result, the output of the power control unit to the vehicle electrical system may be a low current output (e.g., a current that is sufficient to power the vehicle electrical system, but not sufficient to start the engine).

As shown by reference number 140, the vehicle may be immobilized while power is still provided to the vehicle electrical system as a result of the power control unit activating the bypass circuit (e.g., in the immobilization state). As described above, the power control unit in the immobilization state may cause a current level provided by the battery to be reduced (e.g., by directing the current through the resistor of the bypass circuit). The reduced current level may be insufficient to start the engine but may be sufficient to power electrical components of the vehicle, such as an onboard computer, a radio, a heating and/or cooling system, and/or the like.

Figure 1D:
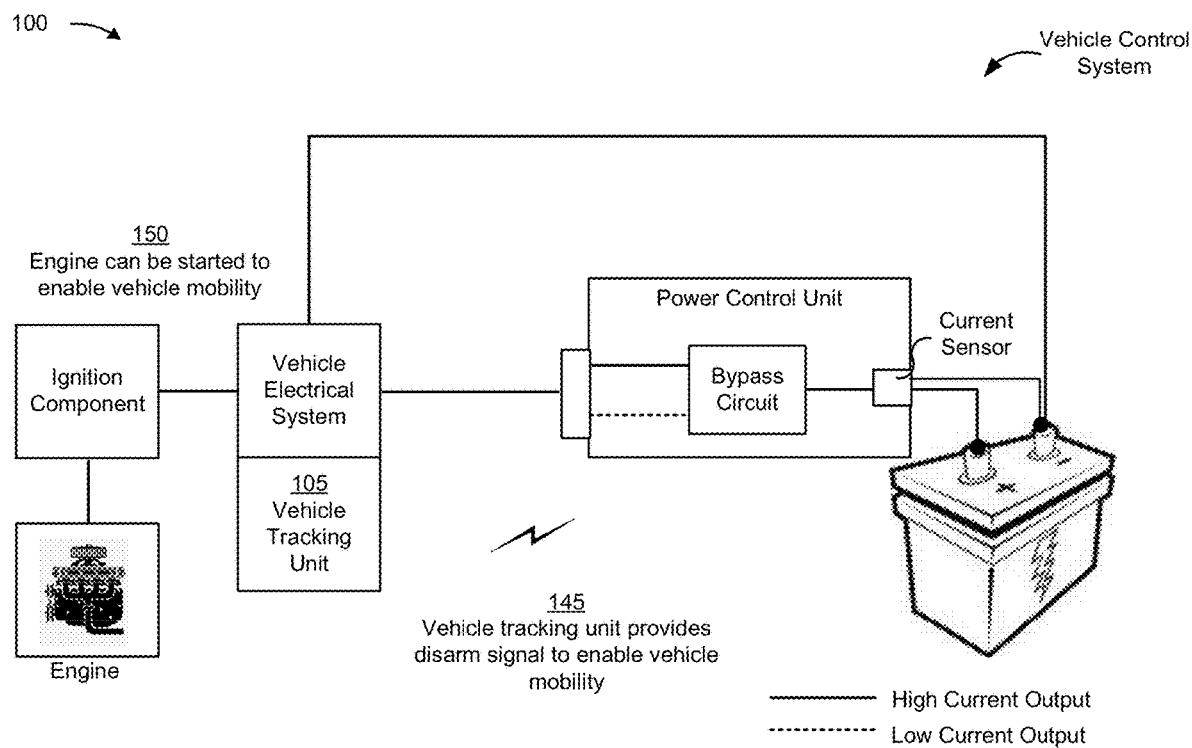

As shown in FIG. 1D, and by reference number 145, the vehicle tracking unit 105 may provide a disarm signal, to the power control unit, to enable vehicle mobility. For example, the vehicle tracking unit 105 may provide the disarm signal based on a command received from the vehicle monitoring platform 110. In some implementations, the vehicle tracking unit 105 may provide the disarm signal based on a schedule identified in a command from the vehicle monitoring platform 110 (e.g., to disarm the power control unit on certain days, during certain times, and/or the like).

The power control unit may be placed in a normal mode based on receiving the disarm signal from the vehicle tracking unit 105. In the normal mode, the power control unit may not monitor a current output from the battery of the vehicle, may not activate the bypass circuit, and/or the like. As a result, the current output from the battery may be provided directly to the lead of the vehicle electrical system (e.g., without passing through the resistor of the bypass circuit). In other words, in the normal mode, the resistor of the bypass circuit may be bypassed such that the flow of current from the battery to the vehicle electrical system is not altered.

As shown by reference number 150, the engine may be started to enable vehicle mobility based on the power control unit being in the normal mode. For example, the ignition component and/or the vehicle electrical system may cause the battery to provide additional power (e.g., a high current output) to initiate the mechanical process to start the engine. The power control unit may output the high current output to the lead of the vehicle electrical system. As a result, the engine may receive sufficient power to start the engine.

Figure 1E:
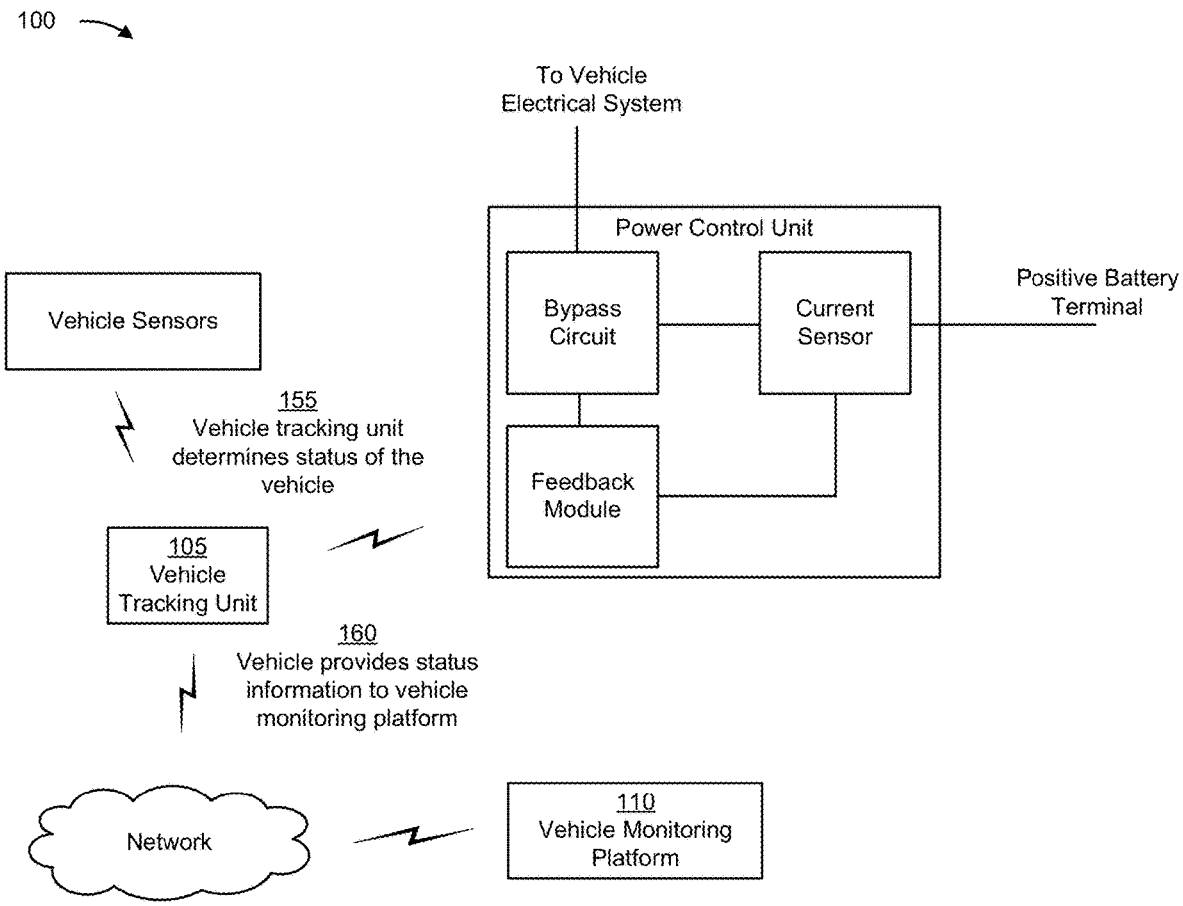

As shown in FIG. 1E, the power control unit may include a feedback module configured to provide feedback to the vehicle tracking unit 105. For example, the feedback module may provide feedback related to a direction of current flow through the power control unit, a magnitude of the current flowing through the power control unit, and/or the like. As shown by reference number 155, the vehicle tracking unit 105 may determine a status of the vehicle based on information received from the power control unit (e.g., from the feedback module and/or the current sensor), from one or more sensors of the vehicle (e.g., a hood sensor, a microphone, a vibration sensor, a temperature sensor, a movement sensor, and/or the like).

The vehicle tracking unit 105 may determine an operating status of the vehicle, a battery status of the vehicle, a movement status of the vehicle, a location status of the vehicle, and/or the like. For example, the vehicle tracking unit 105 may determine an engine status of the vehicle, such as whether the engine of the vehicle is in operation (e.g., running, started, and/or the like) based on detecting an increase in current provided by the battery (e.g., indicating a start up of the engine, as described above), based on a direction in which the current is flowing through the power control unit, based on a temperature of the engine, based on a movement of the vehicle (e.g., indicated by the movement sensor, such as an accelerometer and/or the like), and/or the like.

In some implementations, the vehicle tracking unit 105 may refrain from providing an arming signal to the power control unit based on determining that the engine of the vehicle is in operation. The vehicle tracking unit 105 may provide the arming signal to the power control unit based on determining that the vehicle of the engine is not in operation. The vehicle tracking unit 105 may verify that the vehicle is stationary and/or that the engine is not in operation prior to providing the arming signal to the power control unit. As a result, the vehicle may not be immobilized, even when an arming command is provided by the vehicle monitoring platform 110, if the vehicle tracking unit 105 determines that the engine of the vehicle is in operation (e.g., to prevent the vehicle from being immobilized in an undesirable location, such as on a road where other vehicles are traveling).

The vehicle tracking unit 105 may determine the battery status of the vehicle, such as a battery level, a charging status of the battery, and/or the like. For example, the vehicle tracking unit 105 may determine a charging status of the battery based on the direction of the current flowing through the power control unit. The vehicle tracking unit 105 may determine a charging rate of the battery that is based on the magnitude of the current flowing through the power control unit (e.g., from an alternator of the vehicle to the battery or from the battery to the vehicle electrical system). In some implementations, the vehicle tracking unit 105 may determine that the battery of the vehicle has a low power output and/or a low current output and should be replaced, based on the magnitude of the current flowing through the power control unit. For example, the vehicle tracking unit 105 may determine that the magnitude of the current flowing through the power control unit during an operation of the vehicle (e.g., engine start up and/or the like) does not satisfy a threshold level associated with the operation.

The vehicle tracking unit 105 may determine the movement status of the vehicle, such as a speed of the vehicle, a location of the vehicle, a direction of travel of the vehicle, and/or the like. For example, the vehicle tracking unit 105 may determine a speed of the vehicle based on the magnitude of the current flowing through the power control unit and/or based on one or more inputs from one or more sensors of the vehicle. The vehicle tracking unit 105 may include a tamper detection unit. The tamper detection unit may determine whether a hood of an engine compartment of the vehicle is open or closed (e.g., based on an indication received from a hood sensor). If the vehicle tracking unit 105 determines that the hood of the vehicle is open, the vehicle tracking unit 105 may determine that the power control unit and/or the vehicle tracking unit 105 may have been tampered with.

As shown by reference number 160, the vehicle tracking unit 105 may provide status information to the vehicle monitoring platform 110 over the network. The status information may indicate a status of the vehicle. For example, the status information may indicate that the engine of the vehicle is in operation, that the engine of the vehicle has been started, that the vehicle is immobilized (e.g., that the power control unit is in the armed state and/or immobilization state), a speed and/or location of the vehicle, a status of the battery of the vehicle (e.g., charging, low power output and/or low current output (e.g., indicating that the battery should be replaced), failed (e.g., dead or providing no current), and/or the like), that the hood of the vehicle has been opened, and/or the like.

The status information may be provided to the vehicle monitoring platform 110 as a notification, an alert, a monitoring status, and/or the like. For example, the vehicle tracking unit 105 may indicate that the engine of the vehicle has been started. The vehicle tracking unit 105 may provide status information indicating that the engine of the vehicle has been started, as an alert to the vehicle monitoring platform 110.

In some implementations, the vehicle tracking unit 105 may provide status information to the vehicle monitoring platform 110 based on a setting or configuration indicated by the vehicle monitoring platform 110. For example, the vehicle tracking unit 105 may only provide certain status information (e.g., indicating that the engine has started, that the engine is running, that a hood of the vehicle has been opened, and/or the like) after receiving an arming command from the vehicle monitoring platform 110. For example, if the vehicle monitoring platform 110 provides a disarm command, the vehicle tracking unit 105 may not provide certain status information to the vehicle monitoring platform 110.

As a result, the vehicle control system (e.g., the vehicle tracking unit 105, the power control unit, and/or the like) may reduce the complexity associated with immobilizing a vehicle by eliminating the need to cut wires or alter a wiring configuration of the vehicle. Moreover, the vehicle control system may ensure that other components of the vehicle may continue to receive power while preventing an ignition component of the vehicle from starting the engine of the vehicle. This may eliminate the undesired effects associated with cutting power to the other components of the vehicle, such as a reset or restart of components (e.g., an onboard computing system, and electrical control unit, and/or the like) of the vehicle.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
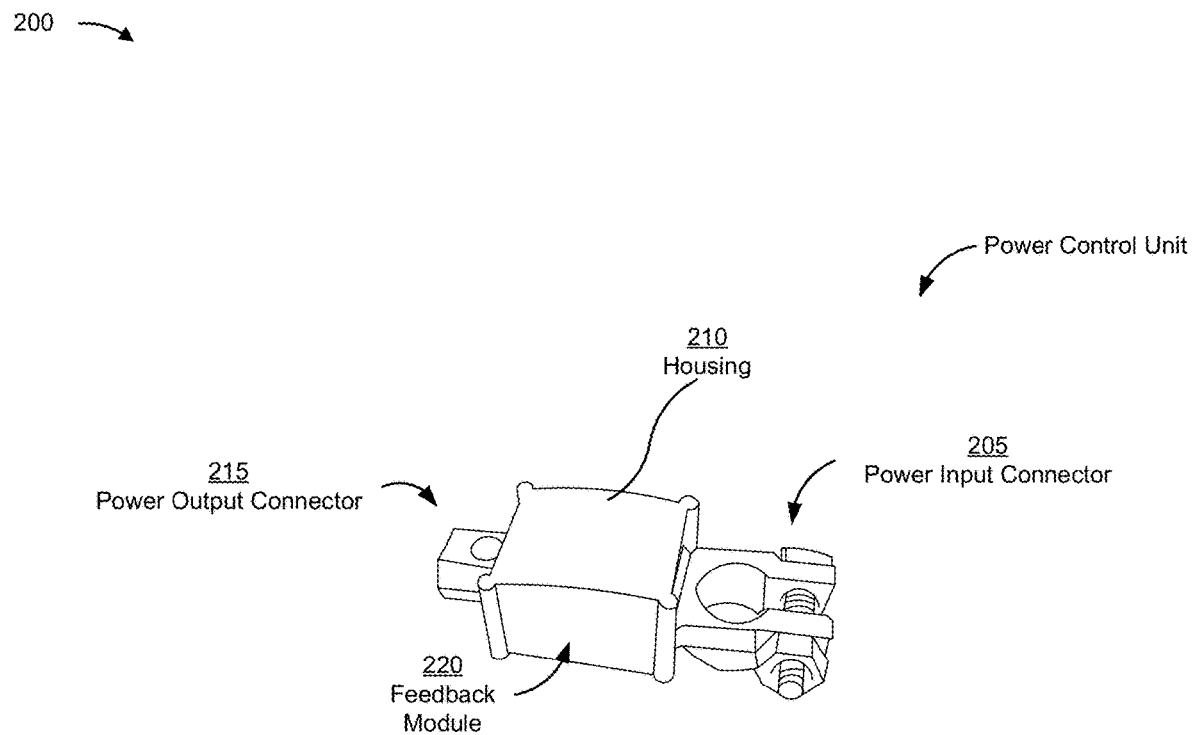
FIG. 2 is a diagram of an example device described herein.

FIG. 2 is a diagram of an example device 200 associated with systems and methods for immobilizing a vehicle. As shown in FIG. 2, device 200 may be a power control unit (e.g., the power control unit of FIGS. 1A-1E) that includes a power input connector 205, a housing 210, and a power output connector 215.

The power input connector 205 may connect the power control unit to a terminal of a battery of a vehicle. The power input connector 205 may be a clamp, a bolt, a cable connector, and/or the like. The power input connector 205 may have a configuration that enables the power input connector 205 to connect to a terminal of a vehicle battery. As described above, terminals of vehicle batteries may be uniform or standardized such that different types of batteries may have the same type or configuration of terminals. As a result, the power input connector 205 may enable the power control unit to connect to a plurality (or all) types of vehicle batteries.

The housing 210 may be a physical housing to protect components of the power control unit. For example, a current sensor, a bypass circuit (e.g., a resistor, a switch component, and/or the like as described above with respect to FIGS. 1A-1E), and/or the like may be located within the housing 210. In some implementations, a feedback module 220 may be located within the housing 210. In some implementations, one or more hardware components to enable wireless communication between the power control unit and a vehicle tracking unit may be located within the housing 210.

The power output connector 215 may connect the power control unit to a vehicle electrical system (e.g., to a lead of the vehicle electrical system). The power output connector 215 may be a post connector that has a similar (or the same) configuration as the terminal of the battery. In this way, the power output connector 215 may enable simple and universal integration into a vehicle, regardless of the type of vehicle (e.g., make of the vehicle, model of the vehicle, year of manufacture of the vehicle, and/or the like).

As the power output connector 215 has a similar (or the same) configuration as the terminal of the battery and the vehicle electrical system may be configured to connect to the terminal of the battery, the vehicle electrical system may be configured to connect to the power output connector 215 without any modifications to the vehicle electrical system. Similarly, as the power input connector 205 may have a configuration that enables the power input connector 205 to connect to a terminal of a vehicle battery, the power control unit may be integrated or installed within a vehicle without any modification to the battery and/or the vehicle electrical system. This may reduce complexity and issues (e.g., based on an error during integration and/or installation) associated with modifying the battery and/or the vehicle electrical system to integrate and/or install a power control unit or similar device.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
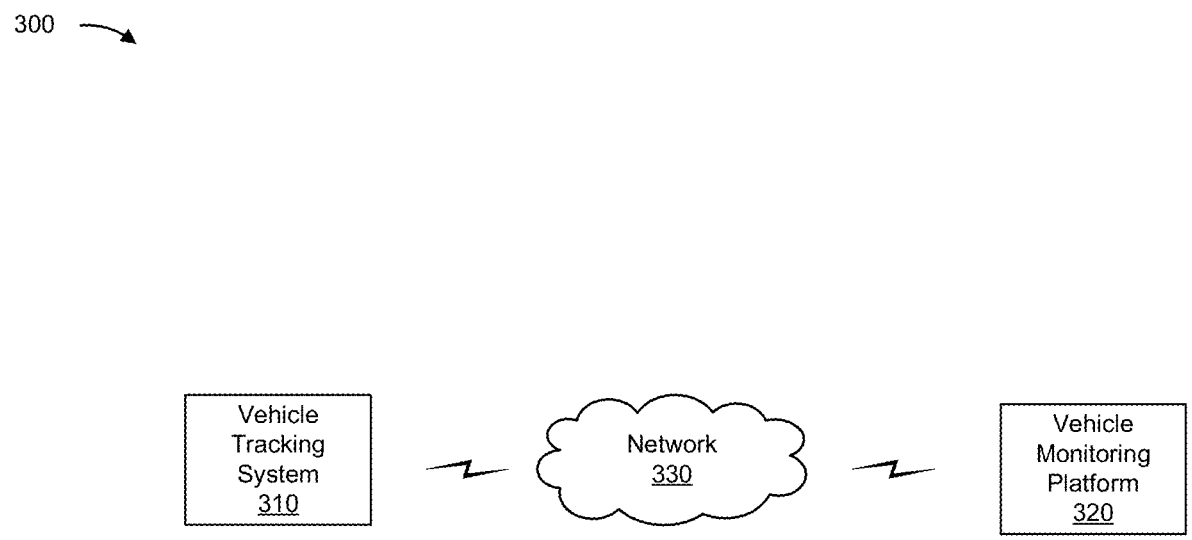
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle tracking system 310, a vehicle monitoring platform 320, and a network 330. Devices of environment 300 may interconnect via wired connections, wireless connections, or a combination of wired and wireless connections.

The vehicle tracking system 310 includes one or more devices capable of receiving, generating, storing, processing, and/or providing information, such as information described herein. For example, vehicle tracking system 310 may be a device (e.g., a circuit, a bypass switch, and/or the like) capable of controlling a power supply from a battery of a vehicle. The vehicle tracking system 310 may be a device capable of monitoring and/or reporting a status of the vehicle. In some implementations, vehicle tracking system 310 may include a power control unit (e.g., the power control unit of FIGS. 1A-1E), a vehicle tracking unit (e.g., the vehicle tracking unit 105 of FIGS. 1A-1E), a GPS device, a telematics device, an onboard diagnostic device, an onboard computing device, a vehicle electronic control unit, and/or the like. In some implementations, vehicle tracking system 310 can receive information from and/or transmit information to vehicle monitoring platform 320. In some implementations, vehicle tracking system 310 can be physically incorporated within, and communicate with, the vehicle.

The vehicle monitoring platform 320 includes one or more devices that monitor and manage a fleet of vehicles, such as the vehicle associated with vehicle tracking system 310. In some implementations, vehicle monitoring platform 320 can be designed to be modular such that certain software components can be swapped in or out depending on a particular need. As such, vehicle monitoring platform 320 can be easily and/or quickly reconfigured for different uses. In some implementations, vehicle monitoring platform 320 can receive information from and/or transmit information to one or more vehicle tracking systems 310. For example, the vehicle monitoring platform 320 may instruct the vehicle tracking system 310 to immobilize a vehicle, may monitor a status of a vehicle (e.g., based on information received from the vehicle tracking system 310), and/or the like. The vehicle monitoring platform 320 may correspond to the vehicle monitoring platform 110 of FIGS. 1A-1E.

The network 330 includes one or more wired and/or wireless networks. For example, the network 330 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
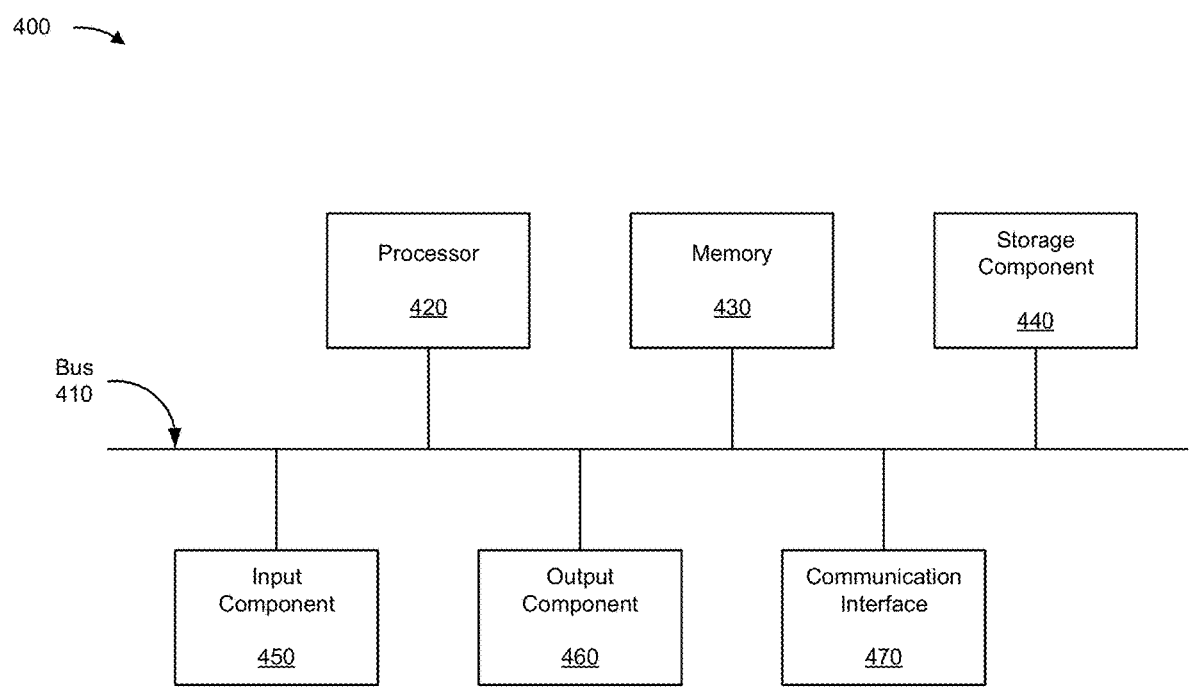
FIG. 4 is a diagram of example components of one or more devices of FIG. 3.

FIG. 4 is a diagram of example components of a device 400. Device 400 may correspond to vehicle tracking system 310 and/or vehicle monitoring platform 320. In some implementations, vehicle tracking system 310 and/or vehicle monitoring platform 320 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more LEDs).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, an RF interface, a universal serial bus (USB) interface, a wireless local area interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
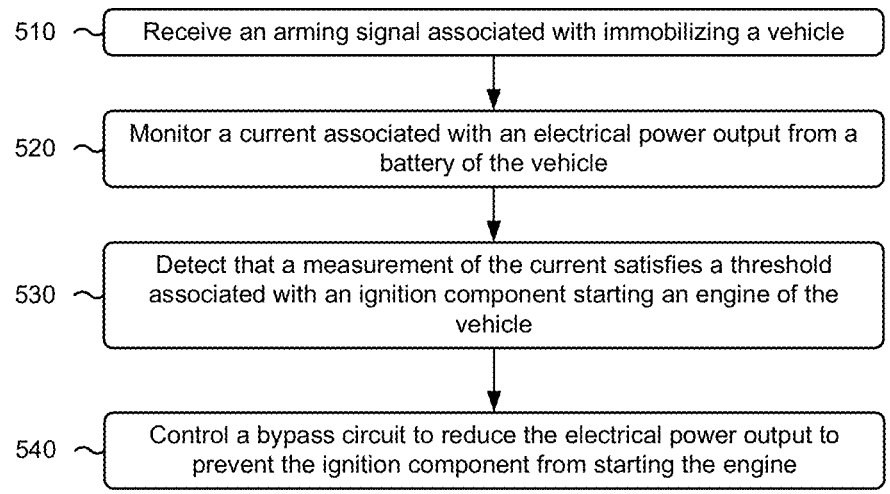
FIG. 5 is a flow chart of an example process relating to systems and methods for immobilizing a vehicle.

FIG. 5 is a flow chart of an example process 500 associated with systems and methods for immobilizing a vehicle. In some implementations, one or more process blocks of FIG. 5 may be performed by a device (e.g., vehicle tracking system 310). In some implementations, one or more process blocks of FIG. 5 may be performed by another device or a group of devices separate from or including the device, such as a vehicle monitoring platform (e.g., vehicle monitoring platform 320), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include receiving an arming signal associated with immobilizing a vehicle (block 510). For example, the device may receive an arming signal associated with immobilizing a vehicle, as described above. For example, the arming signal may be received, via a network, from a vehicle monitoring platform that is associated with the vehicle, or for example, via a BLUETOOTH signal from an agent of the vehicle monitoring platform, or the like.

As further shown in FIG. 5, process 500 may include monitoring, based on receiving the arming signal, a current associated with an electrical power output from a battery of the vehicle (block 520). For example, the device may monitor, based on receiving the arming signal, a current associated with an electrical power output from a battery of the vehicle, as described above.

As further shown in FIG. 5, process 500 may include detecting that a measurement of the current satisfies a threshold associated with an ignition component starting an engine of the vehicle (block 530). For example, the device may detect that a measurement of the current satisfies a threshold associated with an ignition component starting an engine of the vehicle, as described above.

As further shown in FIG. 5, process 500 may include controlling, based on detecting that the current satisfies the threshold, a bypass circuit to reduce the electrical power output to prevent the ignition component from starting the engine (block 540). For example, the device may control, based on detecting that the current satisfies the threshold, a bypass circuit to reduce the electrical power output to prevent the ignition component from starting the engine, as described above. In some implementations, the bypass circuit comprises a resistor, and controlling the bypass circuit comprises setting a switch component to direct the current, to an electrical system of the vehicle that controls the ignition component. For example, the bypass circuit may include a current limiting device that has a resistance that corresponds to a threshold percentage of an ignition resistance of the electrical system, and the ignition resistance may be associated with the electrical system operating the ignition component to start the engine.

In some implementations, controlling the bypass circuit comprises controlling the bypass circuit to output an amount of electrical power that is between a minimum threshold power for powering an electronic control unit of the vehicle and a minimum threshold power for the ignition component to start the engine.

In some implementations, process 500 includes, prior to controlling the bypass circuit, determining an operating status of the vehicle; and verifying, based on the operating status, that the engine of the vehicle is not in operation, wherein the bypass circuit is controlled to reduce the electrical power output based on verifying that the engine of the vehicle is not in operation.

In some implementations, process 500 includes receiving a disarm signal associated with enabling mobility of the vehicle; and controlling, based on receiving the disarm signal, the bypass circuit to permit the ignition component to start the engine.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, an arming signal associated with immobilizing a vehicle;
   monitoring, by the device, a current output from a battery of the vehicle based on receiving the arming signal; and
   controlling, by the device, a bypass circuit to reduce an electrical power output to prevent an ignition component from starting an engine of the vehicle based on the current output.

2. The method of claim 1, wherein the arming signal is received, via a network, from a vehicle monitoring platform that is associated with the vehicle.

3. The method of claim 1, wherein the bypass circuit comprises a resistor, and
   wherein controlling the bypass circuit comprises:
      setting a switch component to direct the current output to an electrical system of the vehicle that controls the ignition component.

4. The method of claim 1, wherein receiving the arming signal comprises:
   receiving the arming signal based on a schedule of a certain time period to immobilize the vehicle.

5. The method of claim 1, wherein controlling the bypass circuit comprises:
   controlling the bypass circuit to reduce the electrical power output,
      the electrical power output being between a minimum threshold power for powering an electronic control unit of the vehicle and a minimum threshold power for the ignition component to start the engine.

6. The method of claim 1,
   further comprising:
      determining a measurement of the current output; and
      wherein controlling the bypass circuit based on the current comprises:
         controlling the bypass circuit based on the measurement of the current output.

7. The method of claim 1, further comprising:
   receiving a disarm signal associated with enabling mobility of the vehicle; and
   controlling, based on receiving the disarm signal, the bypass circuit to permit the ignition component to start the engine.

8. A device, comprising:
   a bypass circuit associated a vehicle; and
   a controller configured to:
      receive a signal associated with immobilizing the vehicle;
      monitor a current output from a battery of the vehicle based on receiving the signal; and
      control, based on receiving the signal, the bypass circuit to direct the current output to an electrical system,
         wherein the bypass circuit is configured to reduce the current output and prevent an ignition component from starting an engine of the vehicle.

9. The device of claim 8, wherein the bypass circuit comprises a switch component that is configured to direct the current output directly to one of:
   a resistor, or
   a power input of the electrical system.

10. The device of claim 8, wherein the bypass circuit comprises a switch component configured to direct the current output to:
   a resistor of the bypass circuit, or
   a power input of the electrical system.

11. The device of claim 8, wherein the controller is further configured to:
   detect an increase in the current output from a battery associated with the vehicle; and
   wherein the controller, when controlling the bypass circuit, is configured to:
      control the bypass circuit based on the increase in the current output.

12. The device of claim 8, wherein the bypass circuit is connected in series between a lead of the electrical system and a terminal of a battery associated with the vehicle.

13. The device of claim 8, wherein the controller, when controlling the bypass circuit, is configured to:
   activate the bypass circuit, by a switch component of the bypass circuit, to direct the current output through a resistor of the bypass circuit.

14. The device of claim 8, wherein the controller, when receiving the signal, is configured to:
   receive the signal based on a schedule, associated with a certain time period, to immobilize the vehicle.

15. A system comprising:
   a power control unit comprising:
      a bypass circuit associated with an electrical system of a vehicle, and
      wherein the power control unit is configured to:
         monitor a current output from a battery of the vehicle; and
   a vehicle tracking unit configured to:
      receive a command associated with the vehicle,
         wherein the command comprises an immobilization command associated with immobilizing the vehicle; and
      perform an action associated with the vehicle,
         wherein the vehicle tracking unit, when performing the action, is configured to:
            provide an arming signal to the power control unit to cause the power control unit to use the bypass circuit to prevent the electrical system from starting an engine of the vehicle based on the current output.

16. The system of claim 15, wherein the bypass circuit comprises a switch component that is configured to one of:
   supply an electrical power output from a battery to the electrical system, or
   provide a reduced power output to the electrical system by directing electrical power through a resistor to generate a reduced electrical power output,
      wherein a setting of the bypass circuit indicates whether the switch component is configured to supply the electrical power output or provide the reduced power output.

17. The system of claim 15, wherein the bypass circuit is connected in series between a lead of the electrical system and a terminal of the battery.

18. The system of claim 15, wherein the vehicle tracking unit, when performing the action, is further configured to:
   verify that a status of the vehicle indicates that the vehicle is stationary; and
   provide the arming signal to the power control unit based on the status of the vehicle indicating that the vehicle is stationary.

19. The system of claim 15, wherein the power control unit is configured to:
   detect an increase in a measure of the current output,
      wherein the measure of the current output is from a battery associated with the vehicle; and
   wherein the power control unit is further configured to:
      control the bypass circuit based on the increase in the measure of the current output.

20. The system of claim 15, wherein the bypass circuit is configured to control a current level and to provide the controlled current level to the electrical system, and
   wherein the power control unit includes the bypass circuit.

* * * * *